(12) United States Patent
Young et al.

(10) Patent No.: US 10,866,852 B2
(45) Date of Patent: Dec. 15, 2020

(54) IMAGE BASED FAULT STATE DETERMINATION

(71) Applicant: HEWLETT PACKARD ENTERPRISE DEVELOPMENT lp, Houston, TX (US)

(72) Inventors: Erik Levon Young, Houston, TX (US); Luis E. Luciani, Jr., Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 108 days.

(21) Appl. No.: 15/744,557

(22) PCT Filed: Sep. 18, 2015

(86) PCT No.: PCT/US2015/051013
§ 371 (c)(1),
(2) Date: Jan. 12, 2018

(87) PCT Pub. No.: WO2017/048288
PCT Pub. Date: Mar. 23, 2017

(65) Prior Publication Data
US 2018/0210774 A1  Jul. 26, 2018

(51) Int. Cl.
*G06F 11/07* (2006.01)
*G06F 11/30* (2006.01)
(Continued)

(52) U.S. Cl.
CPC .............. *G06F 11/079* (2013.01); *G06F 3/14* (2013.01); *G06F 11/0751* (2013.01);
(Continued)

(58) Field of Classification Search
CPC .............................. G06F 11/0766; G06F 11/30
(Continued)

(56) References Cited

U.S. PATENT DOCUMENTS 5,467,449 A   11/1995  Gauronski et al.
6,728,907 B1   4/2004  Wang
(Continued)

FOREIGN PATENT DOCUMENTS

JP       2004030337 A  *  1/2004
WO   WO-2006052435       5/2006

OTHER PUBLICATIONS

International Search Report & Written Opinion received in PCT Application No. PCT/US2015/051013, dated Jun. 20, 2016, 13 pages.

(Continued)

*Primary Examiner* — Chae M Ko
(74) *Attorney, Agent, or Firm* — Hewlett Packard Enterprise Development (57) ABSTRACT

In some examples, a system for determining whether an operating system fault has occurred includes data storage and a processing system. The data storage may store image data indicative of a computing system display output. The processing system may access the stored image data. The processing system may determine that the computing system display output corresponds to a fault display output associated with a fault state of an operating system, which determination may include the processing system determining an extent of similarity between the accessed image data and a reference image associated with the fault display output. The processing system may generate a fault indication responsive to determining that the computing system display output corresponds to the fault display output.

18 Claims, 5 Drawing Sheets

(51) Int. Cl.
*G06F 3/14* (2006.01)
*G06F 11/32* (2006.01)
*G06K 9/34* (2006.01)
*G06K 9/62* (2006.01)
*G06K 9/68* (2006.01)
*G06K 9/72* (2006.01)
*G06F 11/00* (2006.01)

(52) U.S. Cl.
CPC ...... *G06F 11/0769* (2013.01); *G06F 11/0772* (2013.01); *G06F 11/30* (2013.01); *G06F 11/32* (2013.01); *G06K 9/344* (2013.01); *G06K 9/627* (2013.01); *G06K 9/6215* (2013.01); *G06K 9/6857* (2013.01); *G06K 9/72* (2013.01); *G06F 11/3006* (2013.01); *G06K 2209/01* (2013.01); *G09G 2330/12* (2013.01); *G09G 2340/04* (2013.01)

(58) Field of Classification Search
USPC ...................................................... 714/37, 57
See application file for complete search history.

(56) References Cited

U.S. PATENT DOCUMENTS

| | | | |
|---|---|---|---|
| 7,027,042 B2 | 4/2006 | Heo | |
| 7,619,784 B1* | 11/2009 | O'Sullivan | G06K 9/00993 358/403 |
| 7,831,857 B2 | 11/2010 | Muppirala | |
| 8,214,693 B2 | 7/2012 | Caffrey | |
| 8,671,405 B2 | 3/2014 | Nicholas | |
| 8,719,642 B2 | 5/2014 | Laor | |
| 8,868,979 B1* | 10/2014 | Zhang | G06F 11/0706 714/36 |
| 2006/0059175 A1 | 3/2006 | Shimaya et al. | |
| 2006/0110009 A1* | 5/2006 | Klassen | G06T 7/001 382/112 |
| 2007/0171363 A1* | 7/2007 | Chen | A61B 3/145 351/200 |
| 2010/0088545 A1* | 4/2010 | Hishinuma | G06F 11/2284 714/25 |
| 2012/0054485 A1* | 3/2012 | Tanaka | H04L 9/008 713/150 |
| 2012/0137180 A1* | 5/2012 | Shao | G06F 11/0751 714/37 |
| 2012/0265761 A1* | 10/2012 | Atsmon | G06Q 30/0603 707/740 |
| 2013/0250370 A1 | 9/2013 | Kojima et al. | |
| 2014/0063042 A1* | 3/2014 | Hernandez | G06F 8/38 345/592 |
| 2017/0300371 A1* | 10/2017 | Soffer | G06F 11/0709 |
| 2019/0056985 A1* | 2/2019 | Farkas | G06F 11/0712 |
| 2019/0164461 A1* | 5/2019 | Tomioka | B60K 37/02 |

OTHER PUBLICATIONS

MIT, "Recovering and Troubleshooting the Managed System," retrieved online Mar. 9, 2015, http://web.mit.edu/cron/documentation/dell-server-admin/en/DRAC_5/racugc11.htm#1180853.

* cited by examiner

IMAGE BASED FAULT STATE DETERMINATION

BACKGROUND

A computing system includes data storage, a processing system, and a variety of hardware components. The data storage can include executable instructions for an operating system (OS). On startup, the computing system executes the OS, and the OS then manages and prioritizes tasks performed by the hardware components of the computing system. The OS also facilitates the operation of software programs on the computing system. For instance, the OS can allocate processing resources and/or memory resources amongst different software programs to allow those programs to operate concurrently on the computing system.

BRIEF DESCRIPTION OF THE DRAWINGS

The following detailed description references the drawings, wherein.

DETAILED DESCRIPTION

The following description makes reference to the accompanying drawings, in which similar symbols identify similar components, unless context dictates otherwise. The descriptions herein, as well as the drawings, present examples of the subject matter of the present disclosure and are in no way limiting in regard to the subject matter disclosed herein. Throughout the description, the singular forms of "a", "an", and "the" mean "one or more". Thus, various examples in which a component is described in singular form also apply to examples having multiple of those components. Moreover, some aspects of the examples presented herein may be modified, re-arranged, re-ordered substituted, combined, and/or separated in a variety of different configurations without departing from the subject matter of the present disclosure.

In some computing systems, sensors may be arranged to detect operating parameters of hardware components, and sensor data from those sensors may be provided to a monitoring system. In some cases, the monitoring system may receive control signals that are themselves generated by hardware and/or software systems. Some control signals may indicate whether a given component is turned on or off and/or a health state of the component, for example. In some examples, the monitoring system may receive sensor data and/or control signals indicating: chip temperatures, voltage levels, fan speeds, memory errors, power supply status, etc. The monitoring system may then evaluate the received information and perform actions upon the received information meeting specified criteria. For example, the monitoring system may generate an alert message and/or log file(s) if a parameter is outside of its desired operating range.

Network administrators and others responsible for computer networks and other complex systems may use real time data streams from such monitoring systems to identify issues affecting performance of the system. In some cases, a monitoring system may systematically check the reported values to determine whether hardware components are within their respective operating parameters, and generate suitable messages upon detecting values outside those parameters. The monitoring systems may then be used to analyze any issues affecting system performance and identify corrective measures.

In addition, software agents or watchdogs may be used to detect and report the state of OSs and/or other software modules on each of the computing systems. These software agents may be installed on monitored computing systems and run as a background task. The agent may intermittently run checks on the performance and/or status of the monitored software systems and report results of the same by sending a suitable message to the monitoring system.

However, in some cases, software agents themselves may be reliant on the underlying OS software stack to function properly, and some OS failures may therefore prevent the agent from reporting. As such, while receiving a report from such a software agent may indicate a healthy state of the OS, failing to receive such a report may not conclusively indicate an OS failure, much less provide diagnostically relevant information related to the failure. For example, upon ceasing reporting, a network administrator may be faced with several possible explanations for the halt in reporting: communication system failure(s), other hardware failure(s), OS crash, etc. To the extent that such a network administrator could discern that the halt in reporting messages was due to an OS crash, it would be after ruling out other possibilities. Even then, the halt in reporting messages may not indicate any particular type of OS crash or information related to its cause.

Some aspects of the present disclosure provide a technique for detecting an OS failure based on a display output of a computing system. Some OS failures involve the computing system outputting display instructions for a fault screen. When rendered on a display device, the fault screen can indicate to a user that an OS failure has occurred and also provide some indication of the cause, such as an error code or a descriptive message (e.g., "memory overflow", etc.). For computing systems that are connected to a display device being viewed by a user, this information may provide some prescriptive and/or trouble-shooting value for such user. However, many computing systems are not connected to a display device. For instance, a data center may include multiple computing systems used as servers or the like and which are not connected to display devices. Thus, while such computing systems may output display instructions for a fault screen upon an OS failure, these fault screens are not actually rendered on a display device and therefore not readily useful for monitoring and/or diagnostic purposes. Some aspects of the present disclosure include a technique for automatically recognizing display instructions corresponding to a fault screen and responsively generating an alert message.

To manage and monitor such a group of computing systems, each computing system may be associated with a management module. The management module may be a hardware component such as a control card or the like that is electrically coupled to its associated computing system(s). The management module may be to: (i) obtain sensor data from sensors associated with the computing system, (ii) generate and send reports to an external monitor, and/or (iii) cause its associated computing system to perform certain actions, such as restart. For example, the management module may receive sensor data from hardware sensors measuring fan speed, temperature, voltage levels, etc. The management module may include its own communication interface such that its communication is not dependent on the associated computing system and/or its OS. The management module may include a processing system and/or program logic for carrying out its reporting and/or monitoring processes. The processing system of the management module may be separate from the central processing unit (CPU) of the associated computing system. In some cases, the processing system may be a reduced instruction set processor such as an ARM processor or the like. The management module may also cause the computing system to restart, which can set the OS to an initial known state.

The management module may be arranged to sample the display output of the computing system and determine a state of the OS based in part on the display output. For example, the management module may be a peripheral device electrically coupled to chip(s) in the computing system to receive the display output. The management module may be coupled to a connection hub of the computing system's motherboard that carries input/output signals between the CPU and various devices. Depending on the chipset of the computing system, the management module may be coupled and/or installed in various arrangements. In some examples, the management module may have a video adapter incorporated within it and may be coupled to the southbridge of the motherboard, such that display output signals generated by the OS may be accessed by the management module.

The management module may include an image capture engine that obtains samples of at least some of the display output signals. Image data obtained by the image capture engine may then be analyzed for similarity with a known fault display and/or other OS-state-associated displays to determine the state of the OS. Such an image capture engine may obtain image data periodically, upon request, and/or in response to satisfaction of some criteria, such as criteria involving sensor data from the various sensors monitored by the management module.

Once image data is obtained by the management module, the image capture engine may store a copy in a shared memory buffer for comparison with image data for a known fault screen. In some cases, the image capture engine may generate and store a reduced-size image for comparison with the fault screen. The processing system of the management module may then compute an extent of similarity between the comparison image (i.e., the sampled image data) and the fault screen. The extent of similarity may be based on a cross correlation of two images, for example. In some cases, the extent of similarity may be based on a measure of similarity of histograms, color distribution, or other factors. If the extent of similarity exceeds a threshold, the processing system may perform a secondary analysis of the comparison image.

The secondary analysis may be computationally more expensive than the initial comparison. In some cases, the secondary analysis may be performed using a higher resolution image than the initial comparison. The secondary analysis may involve identifying a sequence of characters and/or symbols in a particular region of the comparison image and comparing the identified sequence with a known sequence. For instance, some fault screens may include a known string of characters, such as "If this is the first time you have seen this error screen, restart your computer" or another message that appears in a particular region of the display. The secondary analysis may perform character recognition on the particular region of the comparison image and determine whether characters identified via character recognition correspond to the known sequence of characters. If so, the management module may generate and send a fault message to an external monitoring system and/or log the event.

In some examples, techniques presented herein involve balancing competing interests of conserving processing resources and reducing false detections of fault screens. In some examples, this balance is negotiated by performing the secondary character recognition analysis only when indicated by the primary image-similarity analysis. In particular, processing resources are reserved for analyzing images under the secondary analysis only when indicated by the primary analysis, and the primary analysis may be performed using a reduced-size scaled image. At the same time, an alert is not triggered solely by the initial correlation analysis, and only occurs upon satisfaction of the secondary analysis. This two-stage analysis procedure reduces false alarms in comparison to a procedure that uses only one image analysis technique.

Figure 1:
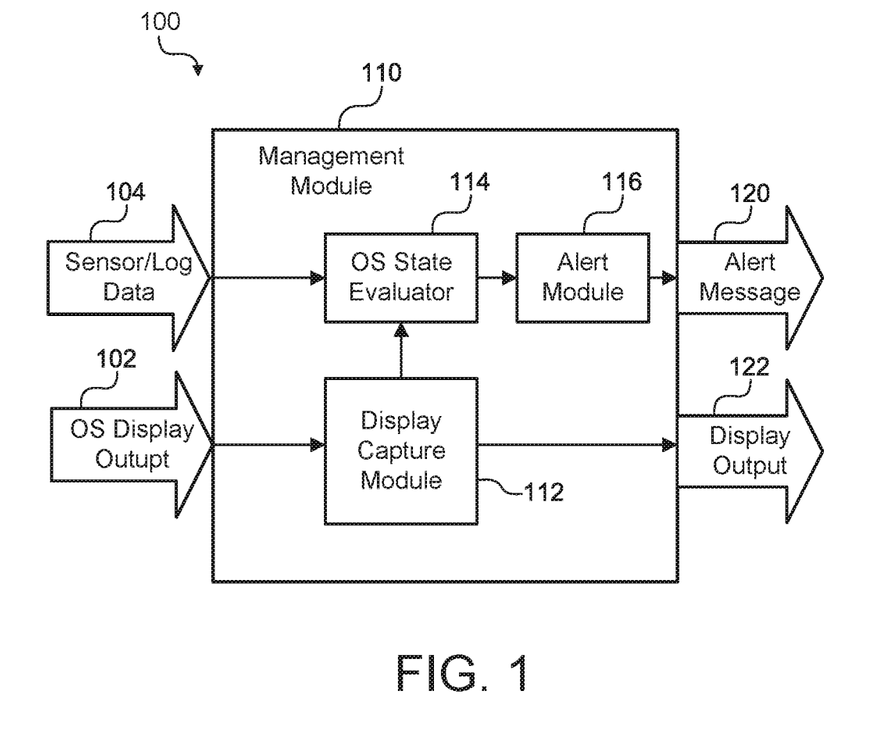
FIG. 1 is a block diagram of an example operating system (OS) fault state determination system.

FIG. 1 is a block diagram of an example OS fault state determination system 100. The OS fault state determination system 100 includes a management module 110, which may include a display capture module 112, an OS state evaluator 114, and an alert module 116. The management module 110 may receive OS display signals 102 and sensor data 104. The management module 110 may be associated with a computing system and used to monitor and/or manage that computing system. The OS display signals 102 may include signals generated by hardware components of the computing system in accordance with an OS installed on that computing system. The display signals 102 may include, for example, display instructions that can cause a display device to render a display to be viewed by a user as part of a user interface of the OS installed on that computing system.

In some examples, the display capture module 112 may receive the OS display signal 102 and output the display output signal 122. In some examples, the display output signal 122 may be output via a display port of the computing system and may be a processed version of the OS display signal 102, such as a version that has undergone processing according to an encoding/decoding process, a filtering process, etc. In some examples, the display output signal 122 may be the same as OS display signal 102. The display capture module 112 may also generate image data based on the OS display signal 102 and provide that image data to the OS state evaluator 114. In practice, the display capture module 112 may sample the OS display signal 102 to generate the image data. For example, generating the image data may involve generating an image based on a video frame from the streaming OS display signal 102 and writing data indicative of that image to data storage accessible to the OS state evaluator 114. In some examples, the display capture module 112 may include a video processing engine to perform certain video-related processing to the OS display signal 102 to thereby generate the display output signal 122. For instance, the display capture module 112 may include a video processor and/or video controller.

The OS state evaluator 114 may receive sensor data 104 and image data from the display capture module 112. The sensor data 104 may include data indicative of measurements from various sensors situated to measure operating parameters of hardware components of the computing system, such as sensors to measure fan speeds, chip temperatures, supply voltages, and the like. In addition, the sensor data 104 may include data indicating state information for the computing system, such as control signals indicating whether the computing system is performing a restart or powered on, or whether the computing system is under control of the "built-in operating system" (BIOS) or the system's installed OS, etc. The OS state evaluator 114 may include a processing system that evaluates the incoming sensor data 104 and image data and determines whether an OS fault has occurred based at least in part on the received image data.

In some examples, the OS state evaluator 114 may initiate an analysis of the image data based on the sensor data 104. In some examples, the OS state evaluator 114 may base its determination of the OS state (i.e., whether the OS is in a fault state) at least in part on the sensor data 104 as well as the image data. For instance, the OS state evaluator 114 may perform an analysis of the image data in response to the incoming sensor data 104 indicating that a measured parameter is outside its desired operating range. In some examples, the OS state evaluator 114 may perform an analysis of the image data periodically without regard to the sensor data 104. For instance, the OS state evaluator 114 may initiate the image analysis upon a timer reaching a predetermined number of counts. Moreover, the timer may be reset whenever an image analysis is performed without regard to how the analysis was initiated. Thus, in some examples, the OS state evaluator 114 may analyze image data at some time interval specified by a timer, or more frequent if indicated by sensor data 104.

The image analysis performed by the OS state evaluator 114 may involve determining an extent of similarity between the received image data and image data corresponding to a known fault display. Image data corresponding to a known fault display may be referred to herein as a reference image. The reference image may be based on display screens rendered by an OS during or subsequent to an OS crash or other OS fault. For instance, the reference image may depict a blue background with white text that describes recovery actions taken ("dumping physical memory") and/or some indication of the cause of the crash, such as an error message or code. The OS state evaluator 114 may determine the extent of similarity between the images by computing the cross correlation coefficient or another measure of correlation between the received image data and the stored reference image. In some examples, other techniques may be used to determine the extent of similarity between the images, such as histogram comparisons, distribution comparisons, comparing characterizations of various image parameters, and/or comparing individual pixel values in different images. In some cases, the OS state evaluator may compute other indicators of the extent of similarity between the images.

For degrees of similarity that exceed a threshold, a secondary image analysis may be performed. The secondary image analysis may include identifying a sequence of symbols, such as alphanumeric characters, depicted within a particular region of the received image. The identified sequence of symbols can then be compared with a reference sequence. The OS state evaluator 114 may determine whether the identified sequence corresponds to the reference sequence. For example, the reference sequence may be a string such as "dumping physical memory" or another sequence of characters that is depicted on a fault screen. In some examples, the OS state evaluator 114 may analyze a particular region of the image data using an optical character recognition (OCR) process to identify characters depicted in that region. In some cases, the OS state evaluator 114 may also determine whether characters are present in the particular region of the received image, which may be indicated by a failure to identify characters or symbols within that region.

In the event that characters are not identified, or that identified characters do not correspond to the reference set of characters, the OS state evaluator 114 may determine that the received image data does not indicate an OS fault state. On the other hand, if the OS state evaluator 114 determines there is a correspondence between the identified characters and the reference set of characters, the OS state evaluator 114 may determine that the received image data matches the reference image. Further, the OS state evaluator 114 may determine that the OS is in a particular fault state that corresponds to the matching reference image.

In some examples, the initial image analysis—extent of similarity—may be performed using a reduced-size, scaled image to allow for more efficient computation of the correlation coefficient. For example, the display capture module 112 may extract image data that corresponds to a single frame of the OS display output 102. The display capture module 112 may generate two images for the primary and secondary image analysis, respectively. One image may be a reduced-size scaled version of the sampled frame. Such a reduced-size version may be analyzed more efficiently than a full-size version by the OS state evaluator 114 to determine its correlation coefficient with a reference image. Accordingly, the display capture module 112 may include an image processing engine to generate scaled images. In addition, the display capture module 112 may generate image data for the secondary analysis. The additional image data may be a higher resolution image of the sampled frame, such as a full resolution image.

In some examples, the additional image data used for the secondary image analysis (i.e., character identification) may include image data for the particular region of the display that is analyzed for characters. For example, the display capture module 112 may generate a lower-resolution, scaled image to be used for the extent of similarity analysis and a higher-resolution cropped image of the sub-region(s) used for the character identification analysis. Other examples are also possible, including examples in which the display capture module 112 provides image data to the OS state evaluator 114 without generating a scaled version.

The alert module 116 may generate and send an alert message 120 to a monitoring system. In some examples, the alert module 116 may include a communication interface that is separate from a communication interface of the computing system that the management module 110 is associated with. As such, the alert module 116 may be able to transmit the alert message 120 independent of the associated computing system, which may have reduced communication functionality as a consequence of an OS fault. For example, the management module 110 may include a network interface card that operates independently of the computing system OS. The alert module 116 may receive data from the OS state evaluator 114 that indicates that an OS fault has occurred. The alert module 116 may responsively generate and send the alert message 120 to a monitoring system. In some cases, the alert message 120 may include information about the type of OS fault, which may be based on the sensor data 104 or may be based on the particular reference image that was matched to the image data from the OS display output 102. For example, the OS state evaluator 114 may compare image data with a set of multiple reference images, each of which correspond to a particular type of OS fault. A match with one of those type-OS-fault-associated reference images therefore indicates the particular type of OS fault has occurred. Data indicative of the type of OS fault can then be included in the alert message 120. In some examples, the alert message 120 may also include other information helpful for facilitating diagnostic and/or restoration procedures, such as identifiers for the associated computing system, version information for the OS involved, and the like.

Figure 2:
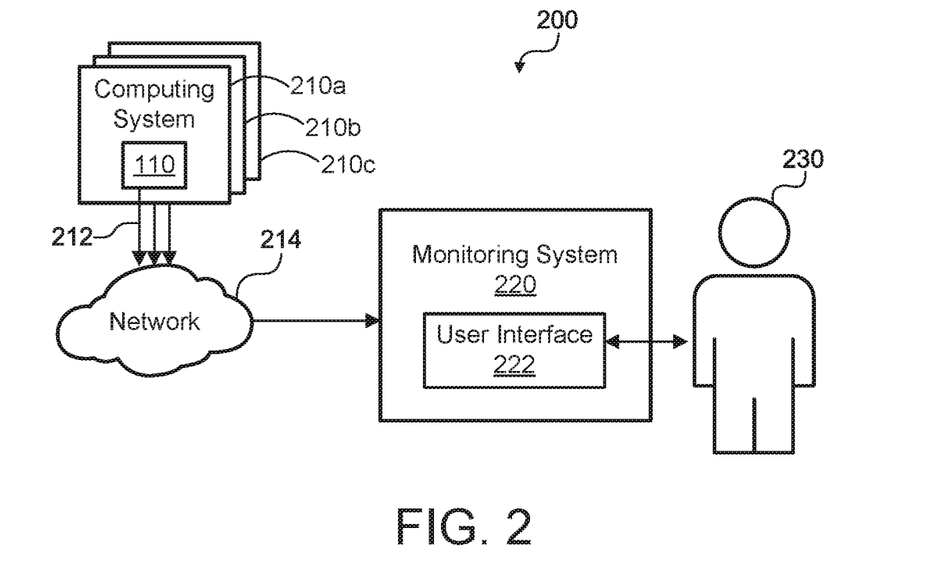
FIG. 2 is a block diagram of an example OS fault state determination system.

FIG. 2 is a block diagram of an example OS fault state determination system 200. The system 200 includes multiple computing systems 210a, 210b, 210c, and a monitoring system 220. Each of the computing systems 210a-c is associated with a respective management module 110. Each of the management modules 110 function as described above in connection with FIG. 1 to determine whether an OS fault has occurred based at least in part on analysis of image data from the OS display output of their associated computing system. The management modules 110 may generate and send alerts to the monitoring system 220 via a communication path 212 that includes a communication network 214. As such, the monitoring system 220 may not be collocated with the computing systems 210a-c. For instance, the computing systems 210a-c may be located in a data center or a remote computing facility and the monitoring system may be situated at a remote user terminal convenient for access by user 230. The user 230 may be a network administrator, for example. The monitoring system 220 includes a user interface 222 for the user 230 to receive information. The user interface 222 may include a display device, an audio system, a haptic feedback system, or another system that allows the user 230 to perceive information. In some aspects, the monitoring system 220 may convey information related to the performance of the computing systems 210a-c to the user 230 via the user interface 222. For example, the monitoring system 220 may receive an alert from the management module 110 and in response generate a corresponding audio and/or visual cue via the user interface 222 that indicates to the user 230 that an alert has been received indicating an OS fault.

In some examples, the management module 110 may be implemented as an application specific integrated circuit (ASIC) or another device that is coupled to the computing system 210a such that the management module 110 can receive the display output. As described above in connection with FIG. 1, each of the management modules 110 may be coupled to their respective computing systems 210a-c so as to receive the OS display output.

Figure 3:
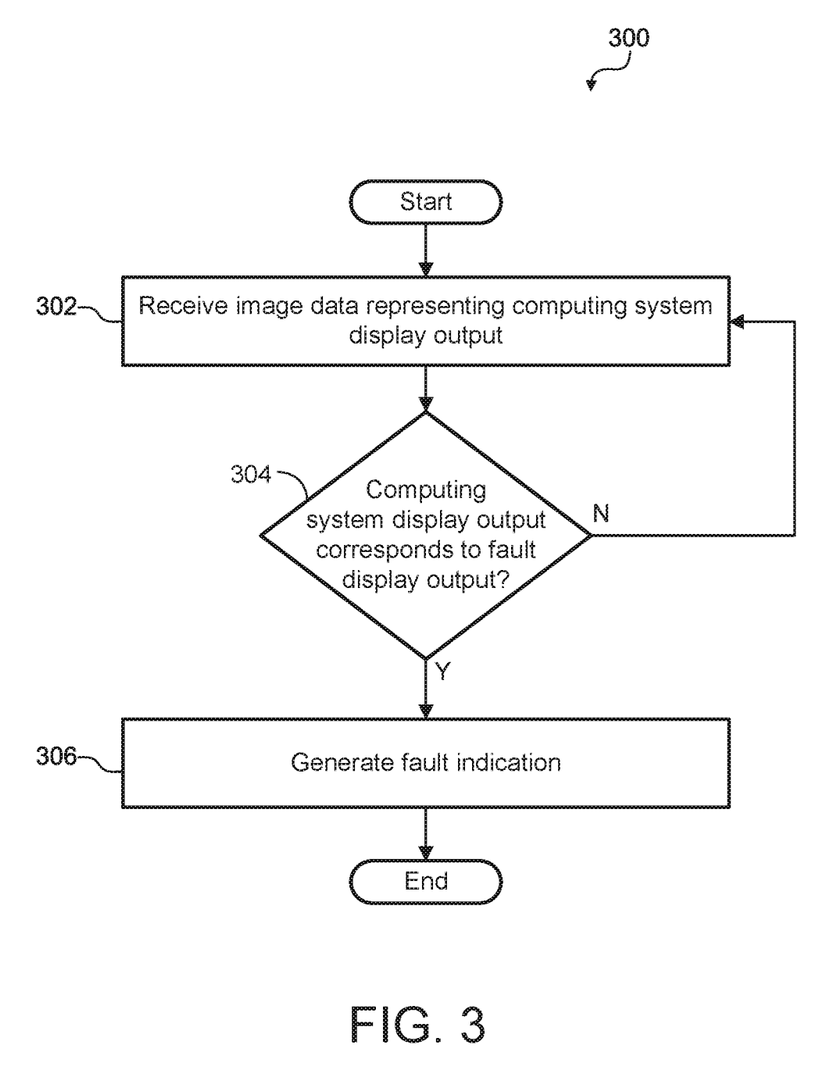
FIG. 3 is a flowchart of an example process for determining a fault state of an OS based on image data.

FIG. 3 is a flowchart of an example process 300. The process 300 may be described below as being executed or performed by a system. For example, the process may be performed by the management module 110 of system 100 described in connection with FIGS. 1 and 2. Other suitable systems and/or computing devices may be used as well. Process 300 may be implemented in the form of executable instructions stored on a machine-readable storage medium of the system and executed by a processor of the system. Process 300 may be implemented in the form of electronic circuitry (e.g., hardware). Some steps of the process may be executed concurrently or in a different order than shown in FIG. 3. Moreover, process 300 may include more or less steps than are shown in FIG. 3. In some examples, steps may be ongoing and/or may repeat.

At block 302, image data representing a computing system display output is received. For example, management module 110 receives the OS display output 102. In some examples, the OS display output 102 can be sampled and used as a basis to generate image data for analysis by the OS state evaluator 114, such as by generating reduced-size, scaled versions of an image representing a single frame of the OS display output 102.

At block 304, the image data received in block 302 is used to determine whether the computing system display output corresponds to a fault display output. For example, the determination of block 304 may be made by the OS state evaluator 114 based on a comparison between image data from the display capture module 112 and a stored reference image. Block 304 may involve a two-stage image analysis in which the image data is first analyzed for a threshold extent of similarity with a reference image. The extent of similarity may be determined by computing a correlation coefficient or another measure of correlation between the two images. In some examples, other techniques may be used to determine the extent of similarity between the images, such as histogram comparisons, distribution comparisons, comparing characterizations of various image parameters, and/or comparing individual pixel values in different images For a given received image that satisfies the first stage of the analysis, a sequence of characters and/or symbols may be identified within a particular region of the given image and the identified sequence can be compared with a reference sequence. The sequence of characters may be identified by processing the particular region using OCR techniques. In some examples, other image analysis techniques for analyzing the similarity between the received image and a reference image (or set of reference images) may be used. In some examples, the received image data may be characterized based on color and/or intensity distributions, and a comparison can be made with those characteristics of the reference image. Some examples may involve using combinations of different image characterization and/or image similarity measures that are compared with respective thresholds.

At block 306, a fault indication is generated. Thus, if it is determined, at block 304, that the computing system display output corresponds to a fault display output, then the process 300 proceeds to generating the fault indication, at block 306. On the other hand, if it is determined, at block 304, that the computing system display output does not correspond to a fault display output, then the process 300 returns to block 302 to receive image data. The image data received upon repeating block 302 may be image data representing a subsequent frame of the OS display output.

Figure 4:
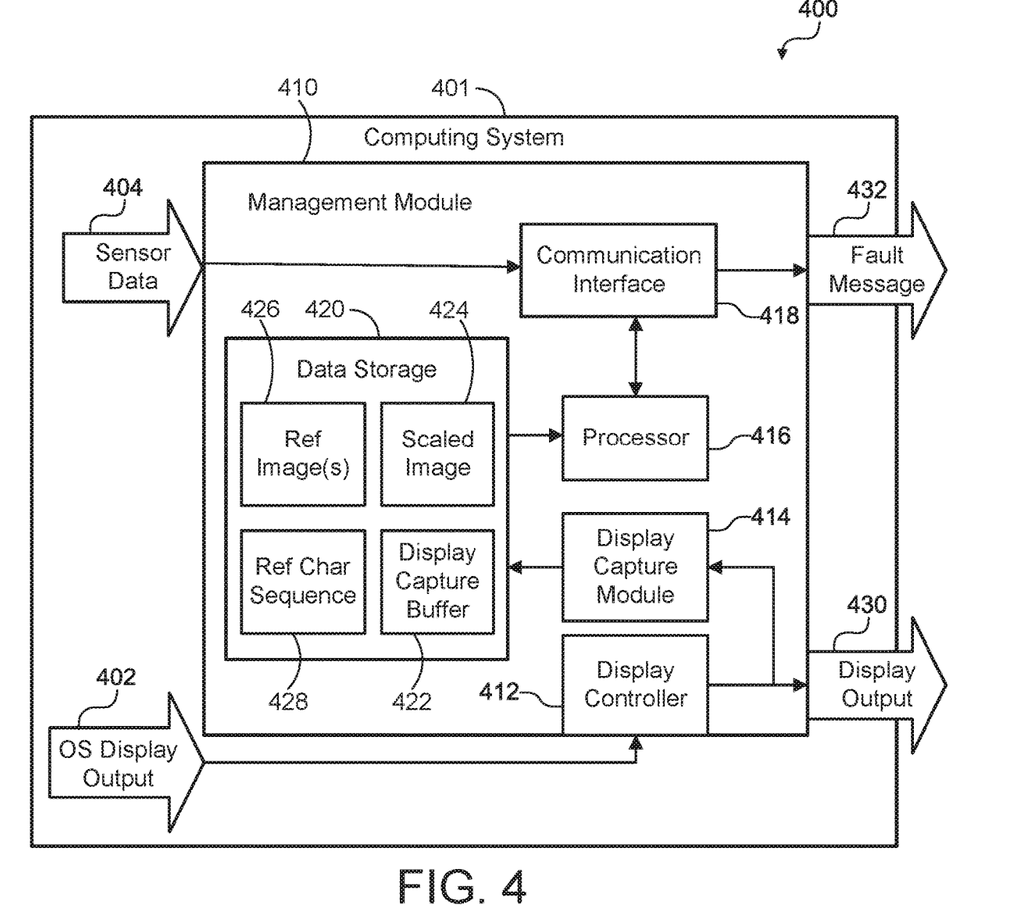
FIG. 4 is a block diagram of an example system for determining a state of an OS based on image data.

FIG. 4 is a block diagram of an example system 400 for determining a state of an OS based on image data. The system 400 includes a management module 410 associated with a computing system 401. The management module 410 may be similar to the management module 110 described above in connection with FIGS. 1-3 which uses image data from a computing system 401 as a basis to determine whether an OS fault has occurred. For instance, the management module 410 may be an example of the management module 110 of FIG. 1 implemented as an application specific integrated circuit (ASIC) that is installed in a housing of the computing system 401.

The management module 410 may facilitate remote management, monitoring, and/or diagnosis by a monitoring system. In some aspects, the management module 410 may include components for re-starting the computing system 401, modifying performance settings and/or configurations of the computing system 401, or otherwise asserting control of the computing system 401. The management module 410 may include a communication interface 418 to allow for such communications to/from the management module 410 and a remote monitoring system. The communication interface 418 may be separate from networking interfaces of the computing system 401.

The management module 410 includes a display controller 412, a display capture module 414, a processor 416, a communication interface 418, and data storage 420. Similar to the management module 110, the management module 410 receives OS display output 402 and sensor data 404. The OS display output 402 is input to the display controller 412, which may be a video controller (e.g., Matrox G200) or another component for video processing. The display controller 412 outputs processed display output 430 via a video port of the computing system.

Data storage 420 may be any electronic, magnetic, optical, or other physical storage device that can be non-transiently encoded to store data. Thus, Data storage 420 may be, for example, Random Access Memory (RAM), an Electrically-Erasable Programmable Read-Only Memory (EEPROM), and the like. Moreover, in some examples, data storage 420 may be implemented as multiple physical devices that are each coupled to the processor 416 and/or display capture module 414 so as to receive instructions to read/write data.

The display controller 412 and/or display capture module 414 may sample the streaming OS display output 402 and generate image data for analysis. The display capture module 414 can write the image data to a display capture buffer 422 of the data storage 420. The display capture buffer 422 may be populated with an image file of a single frame of the streaming OS display output 402. The display capture module 414 may also generate a scaled image 424 that is stored in data storage 420. The scaled image 424 may be a reduced-size scaled version of the captured image. Thus, the scaled image 424 may be a lower-resolution version of the captured image stored in the display capture buffer 422. The scaled image 424 may be compared with reference image 426, which is also stored in data storage 420. The data storage 420 may also store a reference character sequence 428 for comparing with a sequence of characters identified in the sampled image.

Together the reference image 426 and reference character sequence 428 characterize a known fault screen that corresponds to an OS crash or other OS fault. The reference image 426 may be scaled similarly to the scaled image 424 generated by the display capture module 414 such that the reference image 426 is comparable to the scaled image 424 for purposes of computing a correlation coefficient between the two. The reference character sequence 428 may be a text string that is depicted on at least a portion of the fault screen, such as "dumping physical memory" or "if this is the first time you have seen this display," or another sequence of characters. Data storage 420 may also store information indicating the particular region(s) in which the sequence of characters are depicted within the known fault screen. During identification of characters within the sampled image data, the management module 410 may analyze regions of the image data corresponding to the indicated region(s) and identify characters depicted therein.

The processor 416 may be a reduced instruction processing system, such as an ARM processor or the like. The processor 416 is in communication with the data storage 420 and the communication interface 418. The processor 416 may receive sensor data 404 via the communication interface 418. In some examples, the sensor data 404 may include data from hardware sensors that measure various operating parameters of the computing system 401, such as temperatures, fan speeds, voltages, and the like. In some examples, processor 416 may evaluate the sensor data 404 to determine whether the measured parameters are within their desired operating ranges. The sensor data 404 may be used as a basis to initiate an image analysis procedure. For example, if the sensor data 404 indicates that the chip temperature is outside its desired operating range, the processor 416 may coordinate with the display capture module 414 and/or display controller 412 to generate image data for analysis in the display capture buffer 422, and initiate an analysis to compare the obtained image data with the stored reference image 426. In some examples, the sensor data 404 may be used in part to determine an interval timing between subsequent image analyses. For example, a maximum interval timing may be used when all measured parameters are within their desired operating ranges, and the interval timing may be decreased (i.e., frequency of analyses may be increased) if a parameter is outside its desired range.

In operation, the processor 416 determines whether the computing system 401 has experienced an OS fault that corresponds to the stored reference image 426. The determination may involve first comparing the scaled image 424 with the stored reference image 426 by computing the correlation between the two images. In some examples, the extent of similarity between the two images may be computed using another technique for image characterization and/or comparison. The correlation (or other extent of similarity) is compared with a threshold. If the threshold is exceeded, then an OCR analysis may be performed to identify a sequence of characters depicted within a particular region of the image data stored in the display capture buffer 422. If the OCR process is successful, the identified characters may be compared with the stored reference character sequence 428. If the two sequences match (or have a desired degree of correspondence), the processor 416 may determine that the sampled OS display output 402 matches the stored reference image 426. For examples in which the stored reference image 426 is one that corresponds to an OS fault (e.g., a fault screen), determining that the sampled OS display output 402 is a match amounts to determining that the computing system 401 has experienced an OS fault. In response to determining that the computing system 401 has experienced an OS fault, the processor 416 may cause the communication interface 418 to send alert message 432 to a monitoring system.

In the management module 410, the display capture module 414 is used to generate image data for analysis. The display capture module 414 populates the display capture buffer 422 and generates the scaled image 424. The processor 416 accesses the generated image data within the data storage 420. By offloading the image manipulation processes to the display capture module 414, the resources of the processor 416 are reserved to perform the correlation and OCR analyses involved in determining whether the generated image data indicates an OS fault.

Figure 5A:
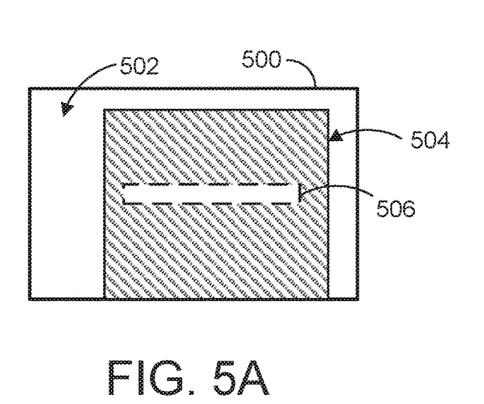
FIG. 5A is a diagram of an example OS fault screen.
Figure 5B:
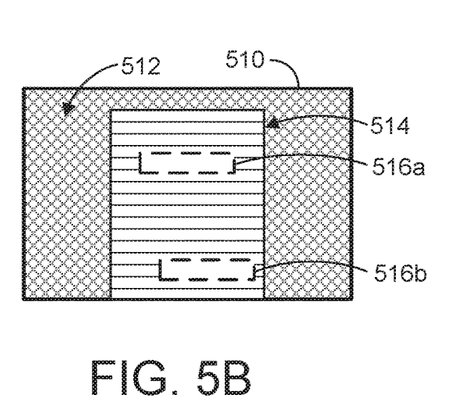
FIG. 5B is a diagram of an example OS fault screen.

FIG. 5A is a diagram of an example OS fault screen 500. FIG. 5B is a diagram of an example OS fault screen 510. In some examples, fault screens may be selected during an initiation and/or calibration procedure in which reference image(s) and/or reference character sequences are stored for future comparisons. Moreover, such stored reference data may be updated from time to time. For example, a monitored computing system may be upgraded to a new OS, at which time a new suitable OS fault screen may be selected, reference character sequence(s) identified, and corresponding reference data may be stored.

Fault screen 500 may include a background region 502 and a foreground region 504. The foreground region 504 may include text, such as text describing the nature of the OS fault, any actions that were automatically performed as a result, and/or suggestions for future actions to be taken. In some examples, the background region 502 may be a blue field and the foreground region 504 may include white text. A subregion 506 of the foreground 504 may be an area in which a reference sequence of characters is depicted. For example, the subregion 506 may include a depiction of text such as "dumping physical memory" or another phrase that always appears on the OS fault screen 500 within subregion 506. In some cases, the subregion 506 may be selected by an administrator or another person familiar with the layouts of various OS fault screens and their contents. As such, the selection of subregion 506 may be based partly on the distinctiveness of the text rendered therein as compared to non-fault screens to help decrease false alarms.

The reference display 510 shown in FIG. 5B may include a background region 512 and a foreground region 514. The background region 512 may be a solid or patterned field. The foreground region 514 may include text. Reference display 510 also includes two subregions 516*a*, 516*b* in which respective sequences of reference characters are depicted on the particular type of OS fault display 510. In some examples, the two subregions 516*a*, 516*b* each include depictions of sequences of characters that are always rendered in those same regions on every instance of the OS fault screen 510.

In some examples, subregion 516*a* may include a sequence of characters that is depicted on fault screens for multiple types of OS faults and subregion 516*b* may include a sequence of characters that is unique to one of those multiple types of OS faults. For example, the text depicted in subregion 516*a* may be a generic message related to multiple types of OS faults and the text depicted in subregion 516*b* may indicate a particular type of fault, such as an error code or error message. Thus, the management module may determine, based on identifying the sequence of characters rendered within region 516*a* that the OS fault screen 510 corresponds to one of a set of known OS faults. The management module may further identify the sequence of characters rendered within region 516*b*, and determine which of the set of known OS faults that the OS fault screen 510 corresponds to.

The two reference screens 500, 510 may correspond to respective types of OS faults or faults for different OSs. In some examples, a management module such as the management modules 110 and 410 may store reference images and character sequences that correspond to either or both of the reference screens 500, 510 for making comparisons.

Figure 6:
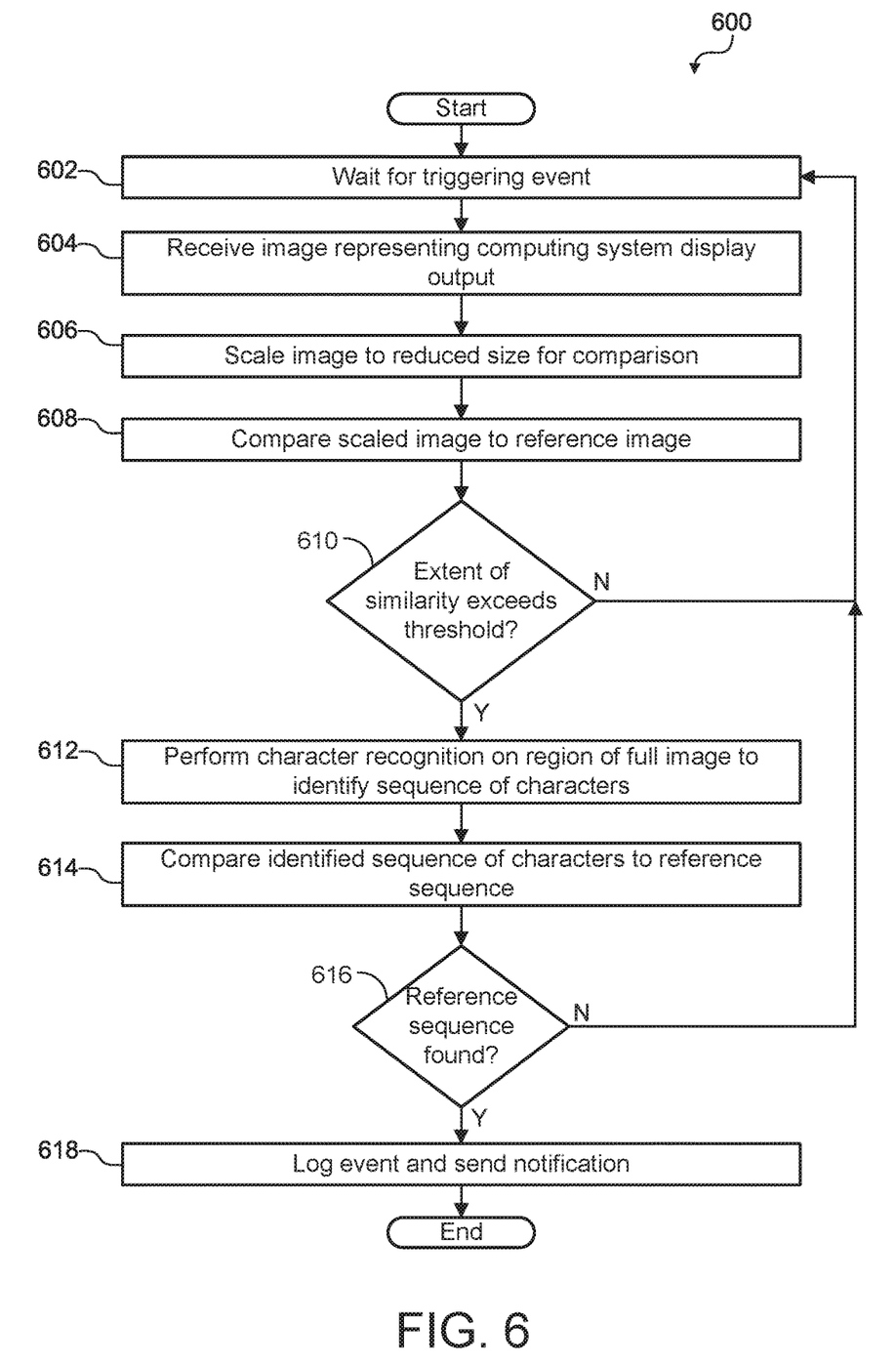
FIG. 6 is a flowchart of an example process for determining a fault state of an OS based on image data.

FIG. 6 is a flowchart of an example process 600 for determining a fault state of an OS based on image data. The process 600 may be described below as being executed or performed by a system. For example, the process may be performed by the management module 110 of system 100 described in connection with FIGS. 1-3 and/or the management module 410 of system 400 described in connection with FIG. 4. Other suitable systems and/or computing devices may be used as well. Process 600 may be implemented in the form of executable instructions stored on a machine-readable storage medium of the system and executed by a processor of the system. Process 600 may be implemented in the form of electronic circuitry (e.g., hardware). Some steps of the process may be executed concurrently or in a different order than shown in FIG. 6. Moreover, process 600 may include more or less steps than are shown in FIG. 6. In some examples, steps may be ongoing and/or may repeat.

At block 602, the system may wait for a triggering event. In some examples, a triggering event may be expiration of an interval timer used to initiate process 600 on a periodic basis. In some examples, a triggering event may be detection of a condition indicated by sensor data, such as a chip temperature outside of a desired operating range. Further, the triggering event may involve an external signal to initiate process 600, such as a prompt from monitoring system 220 that is in communication with monitoring system 110.

At block 604, the system may receive an image representing a computing system display output. For example, the display controller 412 may sample the streaming OS display output 402 and provide image data indicative of a frame of the streaming video to the display capture module 414.

At block 606, the system may receive a scaled image from display hardware. The scaled image may be a reduced-size version that is used for comparison. For example, the scaled image may be generated by display hardware (e.g., an application specific integrated circuit (ASIC)) associated with the display controller 412 and/or the display capture module 414, or by a module situated between the two. In some examples, the display hardware module(s) may generate a scaled version of the sampled image within hardware, and without requiring CPU cycles of the processor 416. The scaled image may be a lower resolution version of the sampled image data that is buffered in the memory. By generating the scaled image, the display capture module 414 enables the comparison with stored reference images (in block 608) to be made using the lower-resolution, scaled images rather than higher-resolution images, which helps conserve processing resources.

At block 608, the system may compare the scaled image with a stored reference image. The system may also determine an extent of similarity between the two images based on the comparison. For example, the processor 416 may compute the correlation coefficient between the scaled image 424 and the reference image 426. In some examples, the comparison between images performed in block 608 may involve other image comparison and/or extent of similarity techniques, such as comparisons based on intensity and/or color distributions. Thus, the comparison between the scaled image and the reference image in block 608 may result in an extent of similarity that can be compared with a threshold.

At block 610, the extent of similarity determined in block 608 is compared with a threshold. If the extent of similarity (e.g., correlation coefficient) does not exceed the threshold, process 600 returns to block 602 to wait for the next triggering event. If the extent of similarity does exceed the threshold, the process 600 continues to block 612. The threshold may be set so as to achieve a desired false alarm rate and may be based on simulation data and/or empirical trials or the like. In an example in which the extent of similarity is the correlation coefficient between the scaled image and the reference image, the threshold may be about 95%. The coefficient of correlation may be computed by various digital image processing algorithms, such as vector displacement, hashing, color histogram, Fourier transforms, etc.

At block 612, the system may perform character recognition on a region of the full image to identify a sequence of characters depicted within the region. For example, upon determining the scaled image 424 is within the threshold extent of similarity of the scaled image 424, the processor 410 may access a higher resolution version of the scaled image 424 that is stored in the display capture buffer 422. The processor 416 may then use an OCR process to identify characters depicted in the higher resolution image. In some examples, the processor may analyze the entire image and identify recognizable characters and/or symbols throughout the image for comparison with a known character sequence. For example, such an approach may be taken if the known character sequence does not necessarily appear in the same region in every instance of the fault screen. In some cases, the fault screen may include a fixed region in which a known character sequence appears, such as in the example fault screens 500, 510 of FIGS. 5A-5B. In such cases, the system may only perform OCR on image data that corresponds to the fixed region rather than the entire image.

At block 614, the system may compare the identified sequence of characters to the reference sequence. At block 616, the system may determine, based on the comparison of block 614, whether the reference sequence is found in the identified sequence.

In some examples, the character recognition process of block 612 may involve some inaccuracies. For example, the OCR process may substitute a number zero character ("0") for a capital letter O in the depicted text, or may substitute a number one character ("1") for a lower case letter L, or may omit some of the depicted characters, etc. As such, the comparison between character sequences, at block 612, and determination of whether the reference sequence is found, at block 614, may not require the two character sequences to precisely match one another. Instead, the comparison process of block 614 may involve determining whether some portion of the reference sequence can be mapped to some portion of the identified sequence. Moreover, the determination of block 616 may involve determining whether the mapped portions identified in block 614 match one another to within a threshold degree of accuracy.

Various techniques may be used to account for the variable reliability of recognizing difference characters via OCR. In some examples, the process of matching the two sequences may involve ignoring some characters appearing in either sequence that are associated with relatively more frequent errors, such as capital letter O and lower case letter L, the numbers zero and one, space characters, and the like. For example, the comparison of block 614 may involve filtering the identified sequence of characters to exclude any such ignored characters, and comparing the filtered sequence with the reference sequence, which may be filtered in the same way. In other examples, some characters may be weighted less than other characters that are more reliably accurately recognized via OCR during a determination of correspondence. In some examples, certain frequently misidentified characters in the identified sequence may be associated with multiple characters for purposes of determining whether the sequences match. For example, a lower case letter T ("t") could be matched with a plus sign ("+"), a capital letter S could be matched with a number five ("5"), etc.

In block 614, a candidate region of the identified sequence may be identified by analyzing segments of the identified sequence and determining whether each segment can be mapped to a segment of the reference sequence of similar length. If one or multiple candidate segments are identified, then the determination of block 616 may involve evaluating the full sequence of which that segment is a part and determining the degree of the correspondence between such full sequence and the reference sequence. In some examples, the degree of correspondence may be determined based on the percentage of characters that are successfully mapped to the known reference sequence. In some examples, the degree of correspondence may be based on a normalized sum of the characters that are successfully mapped to the known reference sequence, in which each character is weighted based in part on the extent of reliability with which that character is recognized via OCR. At block 616, the system may determine whether the determined degree of correspondence exceeds a threshold. The threshold may be set based in part on empirical and/or simulated studies and/or based on a target false alarm rate. If the threshold is met, then the system determines that the reference sequence (or some portion thereof) is included in the identified sequence, which means that the received image data of block 604 is an image of the known fault screen.

If, at block 616, the system determines that the reference sequence is found in the identified sequence then process 600 proceeds with block 618. On the other hand, if the system determines that the reference sequence is not found in the identified sequence, then process 600 returns to block 602 to wait for the next triggering event. Thus, if the system determines that the reference sequence is not found, then the process 600 proceeds as though the received image data of block 604 is not an image of the known fault display. Performing the OCR analysis and determining whether the identified sequence of characters matches the reference sequence carried out in blocks 612-616 thereby helps to reduce false alarms. Display data that appears superficially similar to known fault screens (e.g., as indicated by image correlation coefficient), but do not include the same character sequence will be rejected by the OCR analysis at block 616.

At block 618, which is performed responsive to the determinations at blocks 610 and 616 that the image data has a threshold extent of similarity to the reference fault image and includes the reference sequence of characters, the system may generate a log indicating the occurrence of a fault event and send an alert notification to a monitoring system. For example, management module 410 may use communication interface 418 to send fault message 432 to an external monitoring system. The system may generate a log file that indicates the occurrence of the fault event. Such a log file may also include sensor data and other information useful for diagnostic purposes. The alert message may be conveyed via various protocols, such as an SNMP trap, email alerts, mobile notifications, etc.

Figure 7:
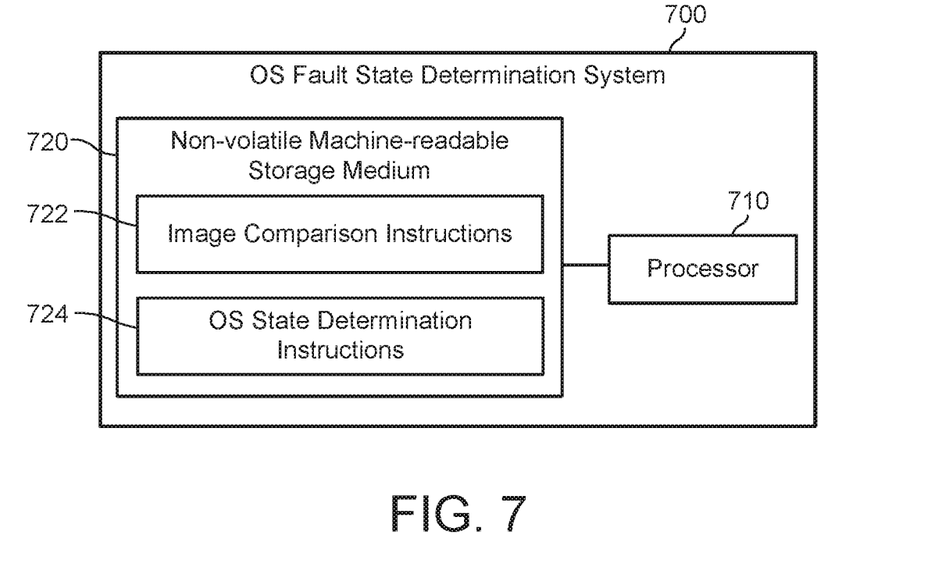
FIG. 7 is a block diagram of an example OS fault state determination system.

FIG. 7 is a block diagram of an example OS fault state determination system 700. System 700 may be similar to systems 110 and 410 described in connection with FIGS. 1-6, for example. In FIG. 7, system 700 includes a processor 710 and a non-transitory machine-readable storage medium 720. Although the following descriptions refer to a single processor and a single machine-readable storage medium, the descriptions may also apply to a system with multiple processors and/or multiple machine-readable storage mediums. In such examples, the instructions may be distributed (e.g., stored) across multiple machine-readable storage mediums and the instructions may be distributed (e.g., executed) across multiple processors.

Processor 710 may incorporate central processing units (CPUs), microprocessors, and/or other hardware devices suitable for retrieval and execution of instructions stored in non-transitory machine-readable storage medium 720. In the example shown in FIG. 7, processor 710 may fetch, decode, and execute instructions 722, 724. In some examples, processor 710 may include electronic circuits having electronic components for performing the processes specified by the instructions in machine-readable storage medium 720. With respect to the executable instruction representations (e.g., boxes) described and shown herein, it should be understood that part or all of the executable instructions and/or electronic circuits included within one box may, in some examples, be included in a different box shown in the figures or in a different box not shown.

Machine-readable storage medium 720 may be any electronic, magnetic, optical, or other physical storage device that stores executable instructions. Thus, machine-readable storage medium 720 may be, for example, Random Access Memory (RAM), an Electrically-Erasable Programmable Read-Only Memory (EEPROM), a NAND or NOR flash memory device, a storage drive, an optical disc, and the like. Machine-readable storage medium 720 may be disposed within system 700, as shown in FIG. 7. In this situation, the executable instructions may be "installed" on the system 700. In some examples, machine-readable storage medium 720 may be a portable, external or remote storage medium, for example, that allows system 700 to download the instructions from the portable/external/remote storage medium. In this situation, the executable instructions may be part of an "installation package". As described herein, machine-readable storage medium 720 may be encoded with executable instructions for comparing image data to a reference image and, based on the comparison, determining whether an OS is in a state associated with the reference image.

Referring to system 700, image comparison instructions 722, when executed by a processor (e.g., 710), may cause system 700 to compare image data with a reference image and determine an extent of similarity between the two. In some examples, the instructions 722 may cause the system 700 to compute a correlation coefficient between received image data and a reference image. In some examples, the instructions 722 may cause the system 700 to analyze some region of the image data via OCR and identify a sequence of characters rendered therein, and to determine whether the identified sequence corresponds to a reference sequence of characters. OS state determination instructions 724, when executed by a process (e.g., 710), may cause system 700 to determine whether the comparison(s) performed in accordance with instructions 722 indicate that received image data matches a reference image. Thus, instructions 724 may cause the system 700 to determine whether the degree(s) of similarity and/or extent(s) of correspondence between character sequences are indicative of the received image data matching the reference image. The instructions 724 may also cause the system 700 to generate and send an alert to a monitoring system upon determining that the image data matches the reference image.

The invention claimed is:

1. A method of a system comprising a hardware processor, comprising:
   receiving sensor data from a sensor;
   responsive to a parameter of a hardware component indicated by the sensor data, trigger a multi-stage image analysis for fault determination, the multi-stage image analysis comprising:
      receiving first image data indicative of a computing system display output, wherein the first image data comprises a first image of a frame of the computing system display output;
      receiving second image data that is a scaled version of the first image data, the second image data having a lower resolution than the first image data;
      in a first stage of the multi-stage image analysis, comparing the second image data to reference image data corresponding to a fault display output; and
      performing a second stage of the multi-stage image analysis responsive to determining, based on the comparison, that a similarity of the second image data to the reference image data exceeds a similarity threshold, the second stage comprising identifying a sequence of characters in the first image data and determining whether a fault state of an operating system is present based on the identified sequence of characters.

2. The method of claim 1, wherein the triggering of the multi-stage image analysis is responsive to a temperature indicated by the sensor data.

3. The method of claim 1, wherein the determining of whether the fault state of the operating system is present comprises comparing the identified sequence of characters to a reference sequence of characters in the fault display output.

4. The method of claim 1, wherein the triggering of the multi-stage image analysis is responsive to a fan speed indicated by the sensor data.

5. The method of claim 1, comprising:
   in the first stage, determining a correlation coefficient based on the comparison of the second image data and the reference image data,
   wherein the determining that the similarity of the second image data to the reference image data exceeds the similarity threshold comprises determining that the correlation coefficient exceeds a correlation threshold; and
   wherein the identifying the sequence of characters comprises applying optical character recognition to identify the sequence of characters in the first image data.

6. The method of claim 1, further comprising:
   sending a fault indication of the fault state to a monitoring system.

7. The method of claim 1, wherein the triggering of the multi-stage image analysis is responsive to a power supply voltage indicated by the sensor data.

8. A system comprising:
   a processor; and
   a non-transitory storage medium storing instructions executable on the processor to:
      receive sensor data from a sensor;
      responsive to a parameter of a hardware component indicated by the sensor data, trigger a multi-stage image analysis for fault determination, the multi-stage image analysis comprising:
         receiving first image data indicative of a computing system display output,
         receiving second image data that is a scaled version of the first image data, the second image data having a lower resolution than the first image data,
         in a first stage of the multi-stage image analysis, comparing the second image data to reference image data corresponding to a fault display output,
         performing a second stage of the multi-stage image analysis responsive to determining, based on the comparison, that a similarity of the second image data to the reference image data exceeds a similarity threshold, the second stage comprising identifying a sequence of characters in the first image data and determining whether a fault state of an operating system is present based on the identified sequence of characters, and responsive to determining that the fault state is present, generate a fault indication.

9. The system of claim 8, wherein the instructions are executable on the processor to trigger the multi-stage image analysis responsive to any or a combination of a temperature indicated by the sensor data, a fan speed indicated by the sensor data, or a power supply voltage indicated by the sensor data.

10. The system of claim 8, wherein the first image data is indicative of a single frame of a display output stream of a computing system.

11. The system of claim 8, further comprising a communication interface to send the fault indication to a monitoring system.

12. The system of claim 8, wherein the instructions are executable on the processor to:
receive a display output produced by the operating system;
generate the first image data based on the display output.

13. The system of claim 8, wherein the instructions are executable on the processor to apply optical character recognition on the first image data to identify the sequence of characters.

14. The system of claim 9, wherein the instructions are executable on the processor to trigger the multi-stage image analysis further based on an operating state of a computing system.

15. A non-transitory machine-readable storage medium comprising instructions that upon execution cause a system to:
receive sensor data from a sensor;
responsive to a parameter of a hardware component indicated by the sensor data, trigger a multi-stage image analysis for fault determination, the multi-stage image analysis comprising:
receiving first image data indicative of a computing system display output,
receiving second image data that is a scaled version of the first image data, the second image data having a lower resolution than the first image data,
in a first stage of the multi-stage image analysis, comparing the second image data to reference image data corresponding to a fault display output,
performing a second stage of the multi-stage image analysis responsive to determining, based on the comparison, that a similarity of the second image data to the reference image data exceeds a similarity threshold, the second stage comprising identifying a sequence of characters in the first image data and determining whether a fault state of an operating system is present based on the identified sequence of characters, and
generate a fault indication responsive to determining that the fault state of the operating system is present.

16. The non-transitory machine-readable storage medium of claim 15, wherein the instructions upon execution cause the system to:
trigger the multi-stage image analysis responsive to any or a combination of a temperature indicated by the sensor data, a fan speed indicated by the sensor data, or a power supply voltage indicated by the sensor data.

17. The non-transitory machine-readable storage medium of claim 16, wherein the instructions upon execution cause the system to:
apply optical character recognition to identify the sequence of characters in the first image data.

18. The non-transitory machine-readable storage medium of claim 16, wherein the system comprises a processor that is separate from a processor of a computing system comprising the operating system.

* * * * *